(12) United States Patent
Ahmad et al.

(10) Patent No.: US 10,261,246 B2
(45) Date of Patent: Apr. 16, 2019

(54) POLARIZATION-MAINTAINING FIBER DEVICE SUPPORTING PROPAGATION IN LARGE MODE FIELD DIAMETERS

(71) Applicant: OFS Fitel, LLC, Norcross, GA (US)

(72) Inventors: Raja A Ahmad, South Bound Brook, NJ (US); Man F Yan, Berkeley Heights, NJ (US); David J DiGiovanni, Mountain Lakes, NJ (US)

(73) Assignee: OFS FITEL, LLC, Norcross, GA (US)

( * ) Notice: Subject to any disclaimer, the term of this patent is extended or adjusted under 35 U.S.C. 154(b) by 8 days.

(21) Appl. No.: 15/474,189

(22) Filed: Mar. 30, 2017

(65) Prior Publication Data

US 2018/0164499 A1 Jun. 14, 2018

Related U.S. Application Data

(60) Provisional application No. 62/434,180, filed on Dec. 14, 2016.

(51) Int. Cl.
*G02B 6/02* (2006.01)
*G02B 6/024* (2006.01)
(Continued)

(52) U.S. Cl.
CPC .......... *G02B 6/024* (2013.01); *H01S 3/06712* (2013.01); *H01S 3/06729* (2013.01);
(Continued)

(58) Field of Classification Search
CPC .............. G02B 6/02042; G02B 6/0281; G02B 6/0288; G02B 6/024; G02B 6/036;
(Continued)

(56) References Cited

U.S. PATENT DOCUMENTS 7,050,672 B1   5/2006 Matsumoto et al.
7,110,647 B2   9/2006 Farroni et al.
(Continued)

OTHER PUBLICATIONS

Larsen, S.H.M., et al., "Polarization-maintaining higher-order mode fiber module with anomalous dispersion at 1 μm", 2012 Optical Society of America, Oct. 15, 2012/vol. 37, No. 20/Optics Letters, pp. 4170-4172.
(Continued)

*Primary Examiner* — Kaveh C Kianni
*Assistant Examiner* — Hung Q Lam
(74) *Attorney, Agent, or Firm* — Wendy W. Koba, Esq.

(57) ABSTRACT

A higher-order mode (HOM) fiber is configured as a polarization-maintaining fiber by including a pair of stress rods at a location within the cladding layer that provides for a sufficient degree of birefringence without unduly comprising the spatial mode profile of the propagating higher-order modes. Long-period gratings are used as mode couplers at the input and output of the PM-HOM fiber, where the gratings are formed by exposing areas of the core region orthogonal to the position of the stress rods. The diameter of the stress rods (D) and displacement of the rods from the center of the core region (R1) are controlled to yield a configuration with an acceptable birefringence and polarization extinction ratio (PER) within the HOM fiber, even in situations where the fiber is bent (a bend radius less than 50 cm).

43 Claims, 6 Drawing Sheets

(51) Int. Cl.
  *H01S 3/067* (2006.01)
  *H01S 3/16* (2006.01)
  *H01S 3/094* (2006.01)

(52) U.S. Cl.
  CPC ...... *H01S 3/06733* (2013.01); *G02B 6/02023* (2013.01); *H01S 3/094007* (2013.01); *H01S 3/1603* (2013.01)

(58) Field of Classification Search
  CPC .... G02B 6/0286; G02B 6/0285; G02B 6/255; H01S 3/094007; H01S 3/06733; H01S 3/067; H01S 3/06754; H01S 3/06712
  USPC ............................................ 385/11, 123–128
  See application file for complete search history.

(56) References Cited

U.S. PATENT DOCUMENTS

| | | | |
|---|---|---|---|
| 7,289,687 B2 | 10/2007 | Izoe et al. | |
| 7,430,353 B2 | 9/2008 | Aikawa et al. | |
| 8,139,912 B2 | 3/2012 | Gapontsev et al. | |
| 8,797,642 B2 | 8/2014 | Chen et al. | |
| 9,031,099 B2 | 5/2015 | Gapontsev et al. | |
| 9,306,364 B2 | 4/2016 | Gapontsev et al. | |
| 9,356,418 B2 | 5/2016 | Saracco et al. | |
| 9,400,352 B2 | 7/2016 | Hayashi et al. | |
| 2005/0008311 A1* | 1/2005 | Farroni | C03B 37/01217 385/123 |
| 2011/0091177 A1 | 4/2011 | Gapontsev et al. | |
| 2016/0033720 A1* | 2/2016 | DiGiovanni | G02B 6/0285 385/24 |
| 2016/0245989 A1 | 8/2016 | Suzuki et al. | |
| 2016/0291247 A1 | 10/2016 | Dong et al. | |

OTHER PUBLICATIONS

Ramachandran, Siddharth, et al., "Generation and propagation of radically polarized beams in optical fibers", 2009 Optical Society of America, Aug. 15, 2009/vol. 34, No. 16/Optics Letters, pp. 2525-2527.

* cited by examiner

POLARIZATION-MAINTAINING FIBER DEVICE SUPPORTING PROPAGATION IN LARGE MODE FIELD DIAMETERS

CROSS-REFERENCE TO RELATED APPLICATIONS

This application claims the benefit of U.S. Provisional Application Ser. No. 62/434,180, filed Dec. 14, 2016, and herein incorporated by reference.

TECHNICAL FIELD

The present invention relates to polarization-maintaining optical fibers and, more particularly, to the inclusion of a polarization-maintaining structure within a large mode area fiber supporting one or more higher-order modes.

BACKGROUND OF THE INVENTION

Polarization-maintaining (PM) fibers typically utilize a pair of stress rods, disposed longitudinally along opposing sides of the core region (symmetrical configuration) to create stress-induced birefringence within an optical signal propagating along the core region of the optical fiber, splitting the signal into orthogonally polarized modes. The stress rods are formed of a material exhibiting a high thermal expansion such that during the process of drawing an optical fiber from a preform, the rods create a stress state that is "frozen" within the final form of the fiber. The diameter (D) of each stress rod, as well as its displacement from the center of the core region (R1), determine the strength of the birefringence that may be achieved. Larger diameter rods and/or closer proximity of the rods to the center of the core region are preferred designs that create a state of higher birefringence (i.e., greater splitting between the orthogonally polarized modes).

PM fibers have successfully been used for many years, primarily in situations where standard single-mode fiber is employed; that is, fibers having core regions no greater than about 10 µm, with surrounding cladding layers sufficiently large enough to allow for optimum placement of relatively large diameter stress rods.

In situations requiring high power outputs, large mode area fibers may be employed, where these fibers are known to have core region diameters in excess of 40-50 µm. Most installations utilizing these high power optical fibers still require that the fiber is able to be coiled (reducing its 'footprint' at a particular location) and, therefore, a maximum fiber outer diameter is typically no greater than about 1 mm or so. Given these constraints, the ability to configure a high power PM fiber where the stress rods are separated from the large-sized core in the same relative relationship as used for conventional fibers is not a realistic option.

Additionally, as the core size increases, more modes are allowed to propagate, giving rise to unwanted mode coupling (including mode coupling of the fundamental mode to higher-order modes, as well as coupling among various higher-order modes). Inasmuch as birefringence splits the degeneracy of these modes along the "fast" and "slow" axes, the density of modes within a polarization-maintaining arrangement is an order of two larger (i.e., higher mode density) than conventional, non-PM large mode area fibers. It has been expected by those skilled in the art that this high density of states will prohibit operation with desired levels of modal purity and polarization extinction necessary for laser or amplifier operations. Moreover, this high mode density has been expected to be exacerbated by fiber bending, as a result of introduced asymmetry into the relationship between the stress rods and the core region.

Furthermore, besides adding the desired birefringence (typically on the order of $>10^{-4}$) between the optical modes and maintaining a polarization extinction ratio (PER) that exceeds 10 dB over a typical fiber length of 1 meter, a useful PM, large-mode-area fiber is expected to maintain other characteristic properties such as a stable spatial distribution with well-separated propagating constants among the various guided modes.

These concerns, among others, would have one skilled in the art conclude that it is unlikely that a polarization-maintaining large mode area fiber useful for laser or amplifier applications can be achieved as a commercial product offering.

SUMMARY OF THE INVENTION

The various problems and concerns mentioned above are addressed by the present invention, which relates to polarization-maintaining optical fibers and, more particularly, to the inclusion of a polarization-maintaining structure within a large mode area fiber supporting one or more higher-order modes.

In accordance with an exemplary embodiment of the present invention, a higher-order mode (HOM) fiber is configured as a polarization-maintaining fiber by including a pair of stress rods at a location substantially within the cladding that provides for a sufficient degree of birefringence without unduly compromising the spatial mode profile of the specific higher-order modes propagating along the polarization-maintaining optical fiber.

As will be discussed in detail below, a set of parameters has been developed associated with the diameter (D) of the stress rods and displacement (R1) of the rods from the center of the core region that yield a configuration with an acceptable birefringence and polarization extinction ratio (PER) within the HOM fiber for specific higher-order modes, even in situations where the fiber is bent. The configurations of various embodiments of the present invention have been found to maintain the desired value of birefringence (with minimal changes in spatial mode profile) for a fiber bend radius down to less than 50 cm.

Exemplary embodiments of the present invention take the form of an optical fiber having an inner, central core for supporting the propagation of a lower-order mode (such as the fundamental mode $LP_{01}$) of an optical signal, surrounded by an outer core for supporting the propagation of one or more selected higher-order modes. The relative refractive index difference between the inner and outer cores is designed to support both the fundamental mode and the higher-order modes. The outer core is surrounded by a cladding region. The propagation of one or more selected higher-order modes is supported by the cladding region, which exhibits a refractive index value that is lower than the refractive index value of the outer core. Various configurations of these exemplary embodiments may comprise one or more separate cladding layers. An inner cladding layer (adjacent to the outer core) may be formed to have a lower refractive index value than an outer cladding layer, where the inner cladding layer may be configured to confine one or more selected higher-order modes to the core. A pair of stress rods is included within the optical fiber and is disposed substantially within the cladding region and positioned symmetrically with respect to the inner core region. Values of D within the range of 50-150 µm and R1 of 40-200 µm have been found to provide acceptable levels of birefringence for the desired large mode field diameters in accordance with one or more embodiments of the present invention. In various embodiments, long-period gratings may be used as mode couplers at the input and output of the PM-HOM fiber.

One property used to evaluate the suitability of a PM-HOM fiber is a normalized effective area, defined as the effective area $A_{eff}$ divided by the square of the propagating wavelength. For the purposes of the present invention, various exemplary fiber design s are able to maintain the desired polarization state (i.e., maintain a defined polarization extinction ratio (PER)) for high power applications at a normalized fiber effective area $A_{eff}/\lambda^2 > 1000$.

One exemplary embodiment of the present invention takes the form of a polarization-maintaining optical fiber comprising an inner core of a predetermined size and having a first refractive index value, with an outer core (exhibiting a second refractive index value) disposed to surround the inner core. A cladding layer (or layers) is disposed to surround the outer core, where the combination of the inner core, outer core and cladding (as well as their relative refractive index values) is configured to support the propagation of lower-order modes (LOMs), including the fundamental LP01 mode, in the inner core and the propagation one or more defined higher-order $LP_{nm}$ modes within the outer core. The PM fiber further includes a pair of stress rods disposed substantially within the cladding layer on either side of the outer core and arranged along a common axis, defining a slow polarization axis, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

Another exemplary embodiment of the present invention may be presented as a polarization-maintaining optical system comprising an optical signal input configuration for supporting the propagation of an incoming lower-order mode optical signal, an input mode converter disposed at an output termination of the optical signal input configuration for converting the lower-order mode to a selected, higher-order $LP_{nm}$ mode; and a polarization-maintaining higher-order mode (PM-HOM) optical fiber coupled to the input mode converter, the PM-HOM optical fiber for supporting the propagation of the selected higher-order $LP_{nm}$ mode. The PM-HOM optical fiber itself is formed to include an inner core of a predetermined size and having a first refractive index value, with an outer core (exhibiting a second refractive index value) disposed to surround the inner core. A cladding layer (or layers) is disposed to surround the outer core, where the combination of the inner core, outer core and cladding (as well as their relative refractive index values) is configured to support the propagation of lower-order modes (LOMs), including the fundamental LP01 mode, in the inner core and the propagation one or more defined higher-order $LP_{nm}$ modes within the outer core. The PM fiber further includes a pair of stress rods disposed substantially within the cladding layer on either side of the outer core and arranged along a common axis, defining a slow polarization axis, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

Various exemplary embodiments of the present invention may be formed as PM-HOM gain fiber for optical amplifiers. In these cases, the light propagating regions are formed to include one or more specific dopants, such as Tm, Er, Yb, Nd, Ho or other rare-earths, that can provide optical gain.

Other exemplary embodiments of the present invention may be formed as single-polarization HOM devices with a tunable frequency bandwidth of operation. For these single-polarization embodiments, a long period grating serves as a source of HOM generation, while also providing mode conversion over a distinct frequency range for different orthogonal polarization states.

Other and further aspects and embodiments of the present invention will become apparent during the following discussion and by reference to the accompanying drawings.

BRIEF DESCRIPTION OF THE DRAWINGS

Referring now to the drawings.

DETAILED DESCRIPTION

We have discovered that for certain ranges of stress rod diameter D and stress rod displacement R1 ("displacement" defined as the separation between a center of the optical fiber and an interior edge of stress rod), it is possible to configure a PM-HOM optical fiber that satisfactorily performs in various high power applications (e.g., lasers, amplifiers, or the like). A birefringence of at least $10^{-4}$ has been obtained for an optical fiber having a normalized effective area ($A_{eff}/\lambda^2$) greater than 1000. By understanding the trade-offs between the diameter of the stress rods and the displacement between the stress rods and the center of the core, it is been found possible to position the stress rods at a specific location where sufficient birefringence is achieved without unduly distorting the spatial electric field distribution of the various propagating optical modes, even when subjected to bending (maintaining a bend radius less than 50 cm).

Figure 1:
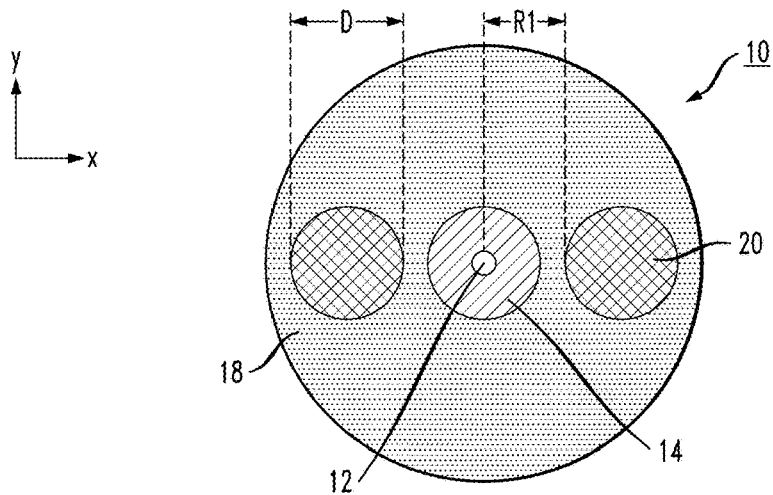
FIG. 1 is a cross-sectional fiber of an exemplary PM-HOM optical fiber formed in accordance with an exemplary embodiment of the present invention.

FIG. 1 is a cut-away view of a PM-HOM optical fiber 10 formed in accordance with an exemplary embodiment of the present invention. In this case, PM-HOM optical fiber 10 includes an inner core 12, surrounded by an outer core 14. In order to support the propagation of higher-order modes, the combination of inner core 12 and outer core 14 comprises a "pedestal" configuration, with a relatively large core diameter (in comparison to conventional single mode or multimode optical fibers). For example, a diameter across outer core 14 in the range of 40-50 μm is typical for a large core diameter application.

A cladding layer 18 is disposed to surround outer core 14. A pair of stress rods 20 formed of a material having a coefficient of thermal expansion (CTE) that is significantly different from the CTE of cladding layer 18. As shown in FIG. 1, the pair of stress rods 20 is disposed substantially within cladding layer 18 and positioned symmetrically with respect to the center of inner core 12. In an exemplary embodiment of the present invention, stress rods 20 comprise boron-doped silica (preferably with a boron concentration in the range of 10 mole % to 30 mole %). In general, stress rods 20 may be formed of any material that exhibits the requisite difference in CTE (with respect to the CTE of the material forming cladding layer 18) required to create stress-induced birefringence within the drawn optical fiber. In one exemplary embodiment, stress rods 20 were formed to exhibit a CTE of $2.37\times10^{-6}$/K (as compared to the surrounding silica cladding layer 18, which has a CTE of $0.5\times10^{-6}$, yielding a difference in CTE (also referred to variously herein as ΔCTE) of about $1.87\times10^{-6}$/K, providing the desired birefringence. In general a ΔCTE in the range of about $0.5\times10^{-6}$/K to $7.5\times10^{-6}$/K is considered to be useful for the purposes of the present invention. Materials such as, but not limited to, $B_2O_3+SiO_2$ and $B_2O_3+P_2O_5+SiO_2$ have been used (with B-dopant having a concentration of 10-30 mole % and the P-dopant concentration being between 0-20 mole %). Other dopants, such as Ge and F, may also be used. Additionally, as discussed below, stress rods are not limited to having a circular geometry.

The core structure as shown in FIG. 1 is designed to guide the fundamental mode $LP_{01}$ of a propagating optical signal within inner core 12, and to propagate higher-order modes (HOMs), for example $LP_{03}$ and/or $LP_{08}$ within both inner core 12 and outer core 14. In general, inner core 12 may be configured to propagate various other non-fundamental, lower-order modes including, but not limited to, $LP_{11}$, $LP_{12}$, and $LP_{21}$ modes. The relative refractive index difference between inner core 12 and outer core 14 is designed to support both the fundamental $LP_{01}$ mode and the higher-order modes (HOMs). In general, inner core 12 has a higher refractive index than outer core 14 (see, for example, the refractive index profile of FIG. 2). However, other embodiments are contemplated for consideration in creating a PM-HOM fiber in accordance with the inventive teachings where, for example, a depressed-index trench may be included between inner core 12 and outer core 14, with the trench having a refractive index that is less than either of the core regions. In this case, the width of the trench is selected to guide the HOMs substantially within outer core 14.

During the fabrication process as the fiber is drawn down from an optical preform, the presence of large ΔCTE stress rods 20 creates a non-uniform radial stress distribution across the fiber cross section, where this non-uniform stress remains "frozen" in the final form of the fiber. As a result, optical signals thereafter propagating within the fiber experience stress-induced birefringence that splits the signal into orthogonally polarized modes, denoted as the orthogonal "fast" and "slow" axes of the fiber.

As mentioned above and discussed in detail below, the diameter D of the stress rods, as well as their displacement R1 from the center of inner core 12 (as shown in FIG. 1) are chosen in accordance with one or more embodiments of the present invention to realize as high a stress-induced birefringence as possible for the selected HOMs propagating within inner core 12 and outer core 14, while minimizing the potential for introducing asymmetries in the spatial mode profile of the guided higher-order modes. Again, it is to be understood that various embodiments may include a depressed-index trench between inner core 12 and outer core 14 in assist in confining HOMs to outer core 14.

Figure 2:
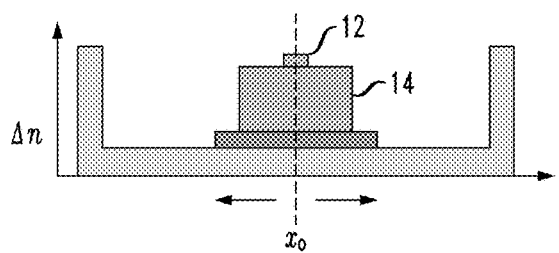
FIG. 2 is a refractive index profile for the exemplary fiber shown in FIG. 1.

FIG. 2 is a refractive index profile for PM-HOM optical fiber 10, in this illustrating case the profile associated with the "slow", horizontal polarization axis, where the propagating optical signal is affected by the presence of the stress rods. As mentioned above, stress rods 20 are formed of a material (for example, borosilicate glass), that will create a large ΔCTE with respect to cladding layer 18. When using borosilicate glass, it is the case that this material exhibits a low refractive index value (indeed, the refractive index value may be similar to the refractive index of cladding layer 18) as shown in FIG. 2. While necessary for providing the difference in thermal expansion property required to create stress-induced birefringence, this low refractive index value may alter the fiber's waveguiding properties in a manner that distorts the propagating beams. In other exemplary embodiments, the composition of stress rods 20 may be configured to exhibit a refractive index value substantially the same as silica glass, thus minimizing the distortion problem. As mentioned elsewhere, dopants such as P, and Ge may be used in combination with, or instead of boron, to form stress rods 20, where various ones of these alternatives may exhibit a refractive index value close to that of silica glass.

Figure 3:
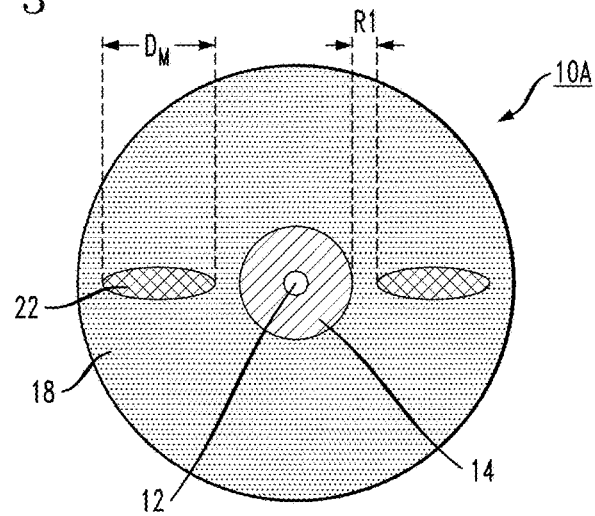
FIG. 3 is a cross-sectional view of an alternative exemplary embodiment of a PM-HOM optical fiber, including non-circular (here, elliptical) stress rods disposed within the cladding.

FIG. 3 is a cross-sectional view of an alternative exemplary embodiment of the present invention. Here, a pair of non-circular stress rods 22 is disposed substantially within cladding region 18 and positioned symmetrically with respect to inner core 12. As shown, stress rods 22 are elliptical in form, in this particular configuration with the major axis of each rod aligned with the "slow axis" of the polarization state induced within the optical fiber (generally, any orientation of the stress rods with respect to the core is contemplated). Similar to the exemplary embodiment discussed above in association with FIG. 1, both the displacement R1 between the center of inner core 12 and an inner edge of each non-circular stress rod 22 and the equivalent diameter $D_M$ (defined below) of stress rods 22 are parameters that are configured in accordance with one or more exemplary embodiments of the present invention to provide polarization-maintaining propagation of a selected higher-order mode optical signal. For non-circular stress rod 22, the equivalent rod diameter $D_M$ is given as $(4A_{cs}/\pi)^{1/2}$, where $A_{cs}$ is the cross-section area of the stress rod. For birefringence analysis of PM-HOM in deploying non-circular stress rods, the equivalent diameter "$D_M$" is used in the same context as "D" in the case of circular stress rods.

Figure 4:
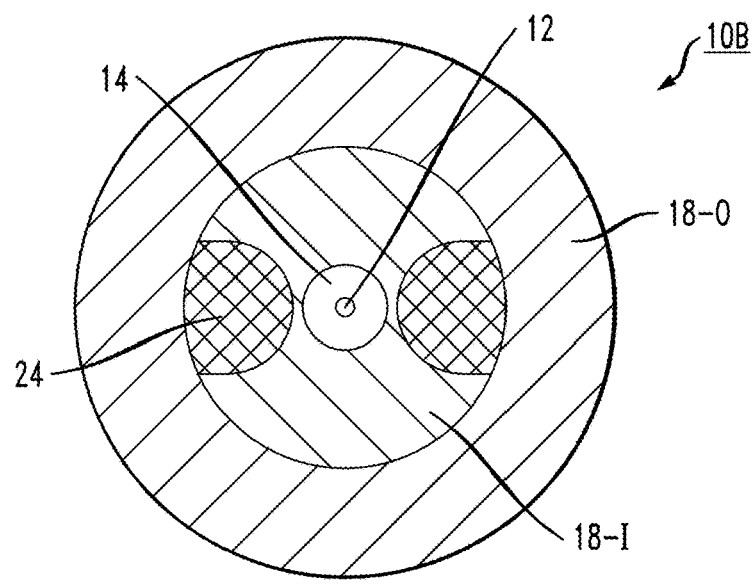
FIG. 4 is a cross-section view of yet another exemplary embodiment of a PM-HOM optical fiber, in this case including a pair of non-circular ("D"-shaped") stress rods.

Yet another exemplary embodiment of the present invention, also using non-circular stress rods, is shown in FIG. 4. In this particular exemplary embodiment, cladding layer 18 is formed as two separate layers: an inner cladding layer 18-I having a first refractive index value, and an outer cladding layer 18-O having a second, higher refractive index value (relative to inner layer 18-I). In this particular embodiment, a pair of "D"-shaped, non-circular stress rods 24 is disposed within inner cladding layer 18-I, disposed at the boundary with outer cladding layer 18-O. Again the diameter D of stress rods 24 and their displacement R1 from the center of inner core 12 are factors useful in providing the desired amount of birefringence within the HOM fiber. It is to be understood that the exemplary "non-circular" geometries shown in FIGS. 3 and 4 are exemplary only, and there exist many other geometries (such as, for example, the known 'bow-tie' stress rod geometry) that may be used in exemplary embodiments of the present invention.

Figure 5:
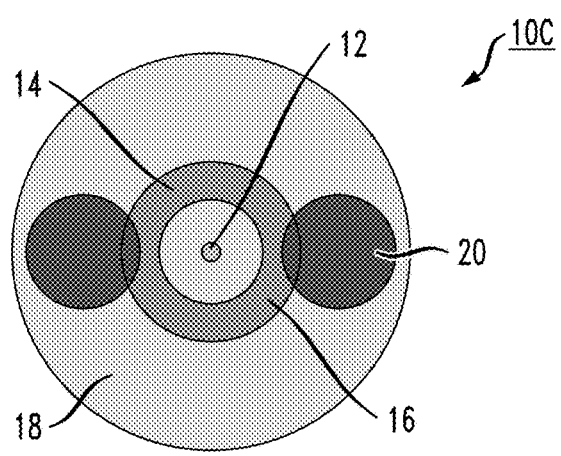
FIG. 5 illustrates yet another exemplary embodiment of a PM-HOM optical fiber formed in accordance with one or more embodiments of the present invention, in this case including a trench region disposed between the outer core region and the cladding layer.

FIG. 5 is a cross-sectional view of yet another polarization-maintaining optical fiber formed in accordance with the present invention. In this particular configuration, a trench layer 16 is disposed between outer core 14 and cladding layer 18. As is well-known in the art, a trench layer having a reduced refractive index value (relative to the core) may be useful in maintaining confinement of the propagating signals to the core region. When used in a polarization-maintaining structure formed in accordance with an exemplary embodiment of the present invention, stress rods 20 may overlap a portion of trench layer 16. The presence of trench layer 16 is not considered to impact the stress-induced birefringence created by the presence of stress rods 20.

Figure 6:
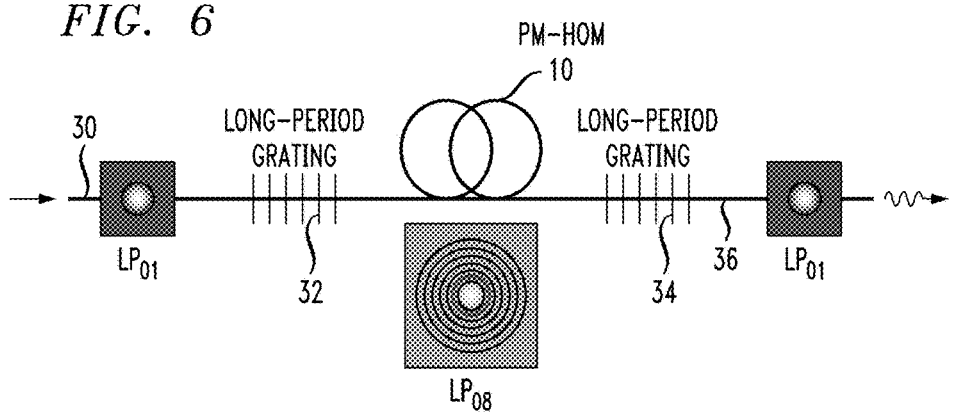
FIG. 6 illustrates an exemplary high power polarization-maintaining optical communication system utilizing a section of PM-HOM fiber in accordance with exemplary embodiments of the present invention.

An exemplary polarization-maintaining, high-power optical system utilizing a section of PM-HOM optical fiber 10 is shown in FIG. 6. In this case, an optical signal input configuration is shown as utilizing an incoming (polarized) optical signal which propagates along a section of conventional PM fiber 30. In this exemplary embodiment, PM fiber 30 provides polarization-maintained propagation of the fundamental $LP_{01}$ mode (or other non-fundamental, lower-order modes, e.g., $LP_{11}$, $LP_{12}$, $LP_{21}$). In order to provide a high power arrangement as necessary for various applications (lasers, amplifiers, etc.), it is desirable to provide a large mode field area. Thus, in accordance with an exemplary embodiment of the present invention, a section of PM-HOM optical fiber 10 is used to achieve the high power results while maintaining the polarization properties of the propagating signal.

Figure 7:
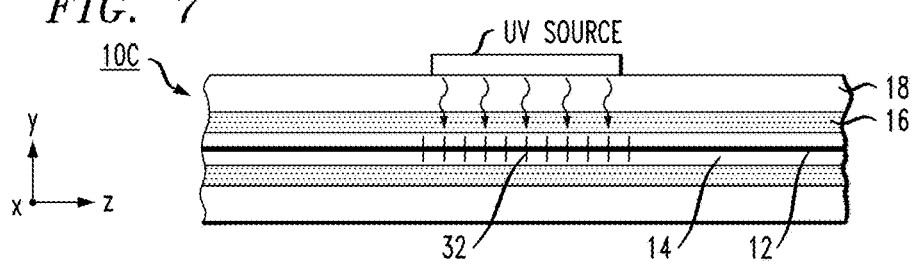
FIG. 7 is a side view of a section of PM-HOM fiber, showing a preferred orientation of the fiber during the process of creating a long-period grating (LPG) used for mode conversion (at the input, and possibly output, of the section of PM-HOM fiber)
Figure 8:
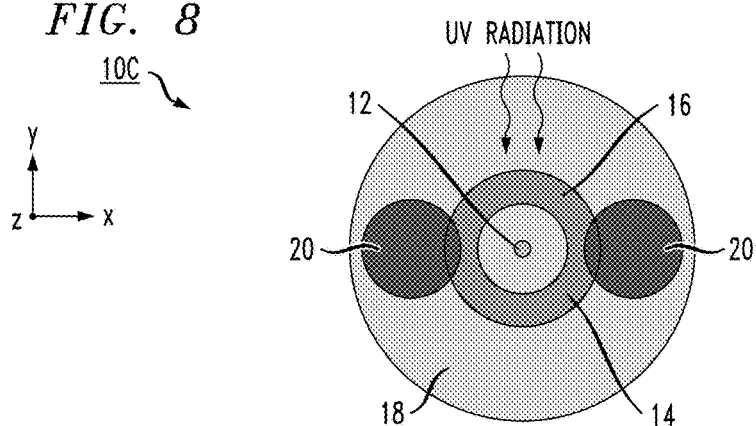
FIG. 8 is a side view of the illustration of FIG. 7, particularly showing the orientation of the UV writing beam (for creating the LPGs) with respect to the stress rods within the PM-HOM fiber.

As shown in FIG. 6, an input mode converter 32 (here, a long-period grating) is disposed at an input end of PM-HOM optical fiber 10 and used to convert the incoming fundamental $LP_{01}$ mode (or other non-fundamental lower order modes, etc, $LP_{11}$, $LP_{12}$, or $LP_{21}$) of the propagating signal to a selected higher-order mode (for example, $LP_{08}$) useful for a specific high power application. As mentioned above, LPGs are typically formed by "writing" a grating structure into a section of the fiber core region, modifying the refractive index along a predetermined length of the core region in manner that causes modal conversion to take place. In accordance with various exemplary embodiments of the present invention, it is preferred that the optical fiber is oriented during LPG fabrication to ensure that the UV-beam is applied along the fast axis of inner core 12 of PM-HOM optical fiber 10. FIG. 7 is a side view showing the application of UV radiation to inner core 12 of PM-HOM optical fiber 10C (as shown in FIG. 5), the UV radiation utilized to create LPG 32, FIG. 8 is an end view of PM-HOM fiber 10C, showing the application of the UV radiation along the fast axis (i.e., orthogonal to the position of stress rods 20).

In various embodiments, LPG 32 may be are formed within only inner core 12 of fiber 10. In other embodiments, outer core 14 may also be photosensitized and, therefore, LPG 32 can be inscribed within only outer core 14. In other words, the gratings are preferably formed within the inner/outer core regions (in accordance with one or more embodiments of the present invention) such that the overlap factor of electric field distribution for the interacting lower-order and higher-order modes is 'non-zero' across the fiber cross-section, which allows energy exchange (conversion) among the interacting modes.

Referring back to FIG. 6, the polarization-maintaining, higher-mode optical output signal from PM-HOM optical fiber 10 is shown as coupled to an exemplary output configuration, in this example comprising a second mode converter 34 which is used to re-convert the processed signal back into a desired, lower-order mode (e.g., fundamental mode $LP_{01}$) signal that will propagate along an output signal path. In one exemplary embodiment, the output from PM-HOM optical fiber 10 is coupled into a section of conventional PM fiber 36.

It is to be understood that the configuration as shown in FIG. 6 is exemplary only and many other configurations for both optical signal input and output configurations are possible. Indeed, certain applications may not require the use of polarization-maintaining mode converters, or may utilize structures other than LPGs to perform mode conversion. As will be discussed below, the creation of LPGs in large mode area, polarization-maintaining optical fiber results in generating certain higher-order modes, which may be used for certain applications (such as, but not limited to, single polarization applications).

Figure 9:
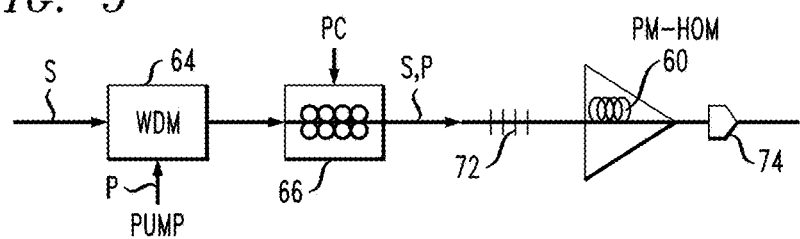
FIG. 9 is a diagram of a fiber-based amplifier arrangement utilizing PM-HOM optical gain fiber formed in accordance with one or more embodiments of the present invention.

As mentioned above, one exemplary embodiment of the present invention is associated with the formation of polarization maintaining fiber-based amplifier arrangements. FIG. 9 illustrates an exemplary optical amplifier utilizing PM-HOM fiber 60 that is formed to include one or more dopants (i.e., Tm, Er, Yb, Nd, Ho or other rare earth dopant) known to provide signal amplification in the presence of a pump signal.

In the exemplary embodiment shown in FIG. 9, the optical signal input configuration is shown as comprising a conventional optical fiber 62 supporting the propagation of an incoming optical signal S. A separate pump wave input P is combined with the incoming signal within a wavelength division multiplexer 64 (or other suitable type of optical combiner), where the combination of signal S and pump P are shown in this exemplary embodiment as passing through a discrete polarization controller 66, used to align both the signal S and pump P along a desired state of polarization (SOP).

The polarized version of the signal and the pump are thereafter passed through an input mode converter 72 (for example, an LPG), which transfers the energy propagating in a lower-order mode into the higher-order mode supported by PM-HOM 60. The presence of the pump wave within the doped fiber of PM-HOM 60 results in generating optical amplification within the polarized optical signal S.

The amplified, polarized output signal form PM-HOM 60 is shown in FIG. 9 as coupled into an output signal configuration, which in this particular exemplary embodiment utilizes an optical lens 74, such as an axicon lens, to perform the mode conversion operation. In accordance with the various embodiments of the present invention, any arrangement that does utilize mode converters should also be properly configured as polarization maintaining devices. In yet another embodiment, a free-space propagating polarized beam may be used as the input to PM-HOM fiber 10, 60, with a suitable lens (such as an axicon lens) used to couple the incoming free-space beam into the PM-HOM fiber.

Figure 10:
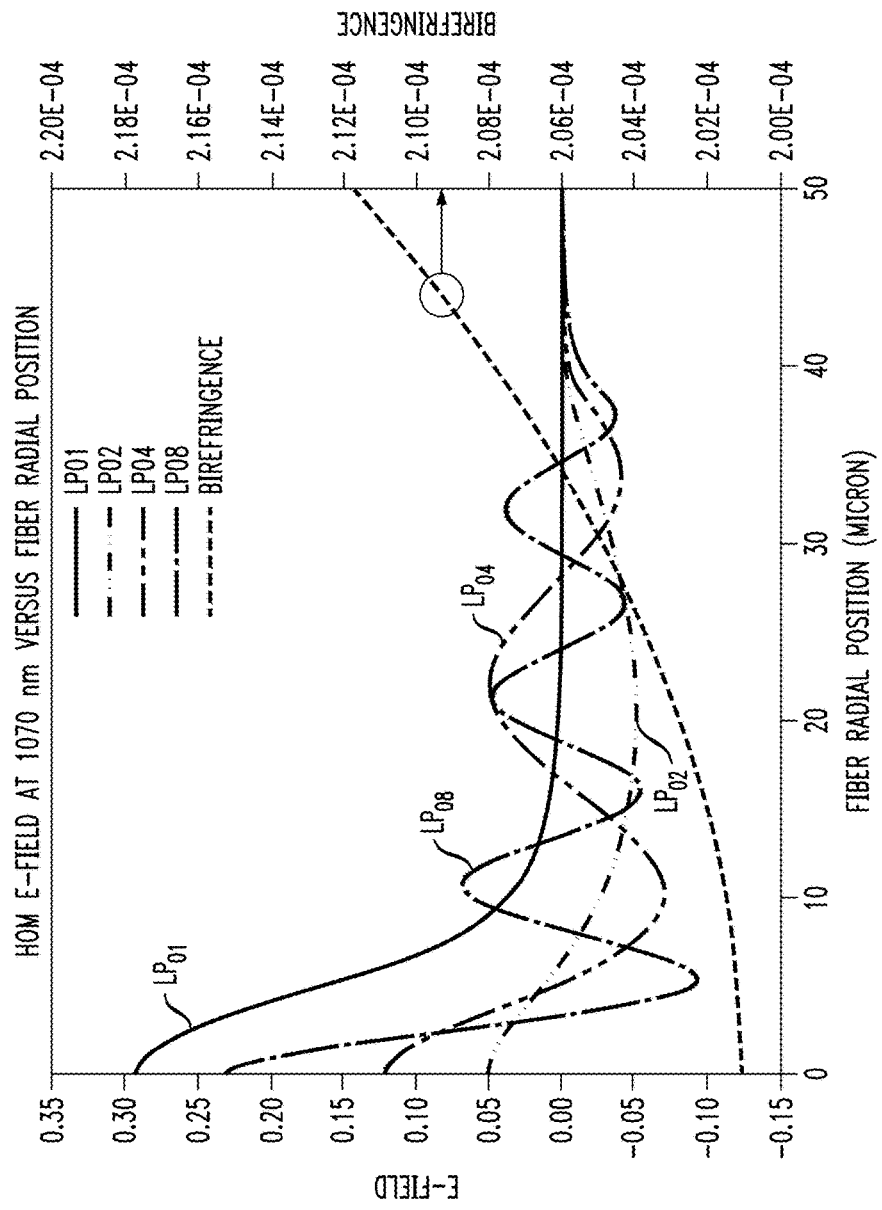
FIG. 10 contains plots of both the electric field and birefringence of an exemplary PM-HOM optical fiber (as measured axially across the core of the fiber) formed in accordance with an exemplary embodiment of the present invention.

Based on waveguide analyses performed on an exemplary configuration of PM-HOM optical fiber 10, the electric fields $E(\theta,r)$ of different $LP_{0m}$ modes has been determined, as a function of the fiber radial position (as measured outward from the center of inner core 12). The results of this analysis are shown in FIG. 10, with reference to the left-hand vertical axis. Also plotted in FIG. 10 is the birefringence $B(r, \theta)$ calculated across this same radial span (and associated with the right-hand vertical axis). The integrated birefringence for PM-HOM optical fiber 10 can then be defined as follows:

$$B_{integrated} = \frac{\int_0^{2\pi} \int_0^R E(\theta, r) * E(\theta, r) * B(\theta, r) * r * d\theta dr}{\int_0^{2\pi} \int_0^R E(\theta, r) * E(\theta, r) r * d\theta dr}$$

The integrating birefringence of the various higher order modes $LP_{0m}$ does not change significantly from that of the fundamental ($LP_{01}$) mode, as shown in Table 1, below.

TABLE I

| Mode | Integrated Birefringence (values in $10^{-4}$) |
|---|---|
| $LP_{01}$ | 2.011 |
| $LP_{02}$ | 2.034 |
| $LP_{03}$ | 2.035 |
| $LP_{04}$ | 2.034 |
| $LP_{05}$ | 2.034 |
| $LP_{06}$ | 2.033 |
| $LP_{07}$ | 2.033 |
| $LP_{08}$ | 2.033 |
| $LP_{09}$ | 2.035 |
| $LP_{0.10}$ | 2.047 |

It is useful to note that while the stress-induced birefringence $B(r,\theta)$ has an azimuthal ($\theta$), angular dependence, the electrical fields of the radially symmetric $LP_{0m}$ modes do not. Therefore, the stress birefringence term that contains the "$\cos(2\theta)$" dependence can be ignored since an integration over $\cos(2\theta)$ from 0 to 360 degrees will be zero. While other HOMs $LP_{nm}$) do exhibit a stress birefringence having a $\cos(2\theta)$ dependence, its effects are minimal when the mode electrical field extends substantially less than the stress rod center (e.g., about 112.5 μm in one example). Thus, it has been found that birefringence can be introduced into other radially non-symmetric HOMs, $LP_{nm}$, where n<3 and m>1.

Figure 11:
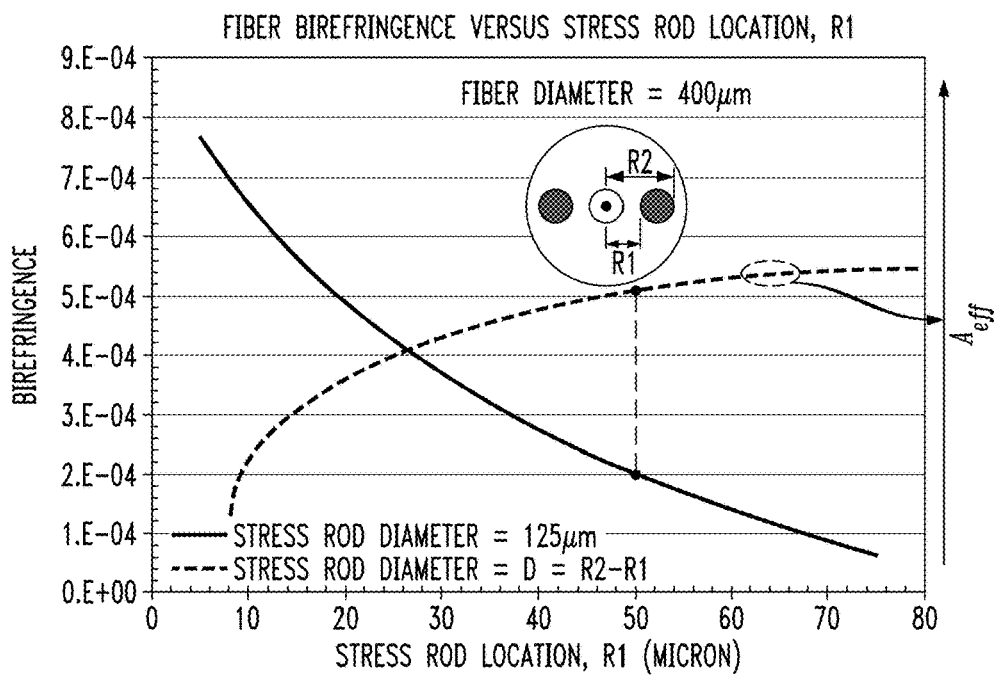
FIG. 11 is a plot of birefringence as a function stress rod location with respect to the PM-HOM fiber core region (R1)

The effects of different stress rod locations R1 on birefringence are shown in the plot of FIG. 11. The values determined here are based on the use of circular stress rods 20 with a diameter D of 125 μm, disposed symmetrically about inner core 12 (shown in the inset of FIG. 11). It is clear from this plot that as the stress rods are positioned farther away from inner core 12, the birefringence effect becomes weaker, resulting in less polarization splitting between the two axes. On the other hand, there is also a limit on how close the stress rods can be placed with respect to inner core 12 (i.e., a minimum value of R1) while still providing the desired large mode area for the high power requirements of the fiber. The effective area $A_{eff}$, measured as a function of stress rod location, is also plotted in FIG. 11.

In reviewing the information presented in the plots of FIG. 11, an exemplary embodiment of the inventive PM-HOM optical fiber may be designed to utilize a stress rod location R1 of about 50 μm, corresponding to an optimal value for $A_{eff}$ while also providing an acceptable birefringence of about $2\times10^{-4}$. When the stress rod diameter is chosen to that yielding the maximum birefringence value, small variations in stress diameter have little effects on the actual birefringence as described below.

Figure 12:
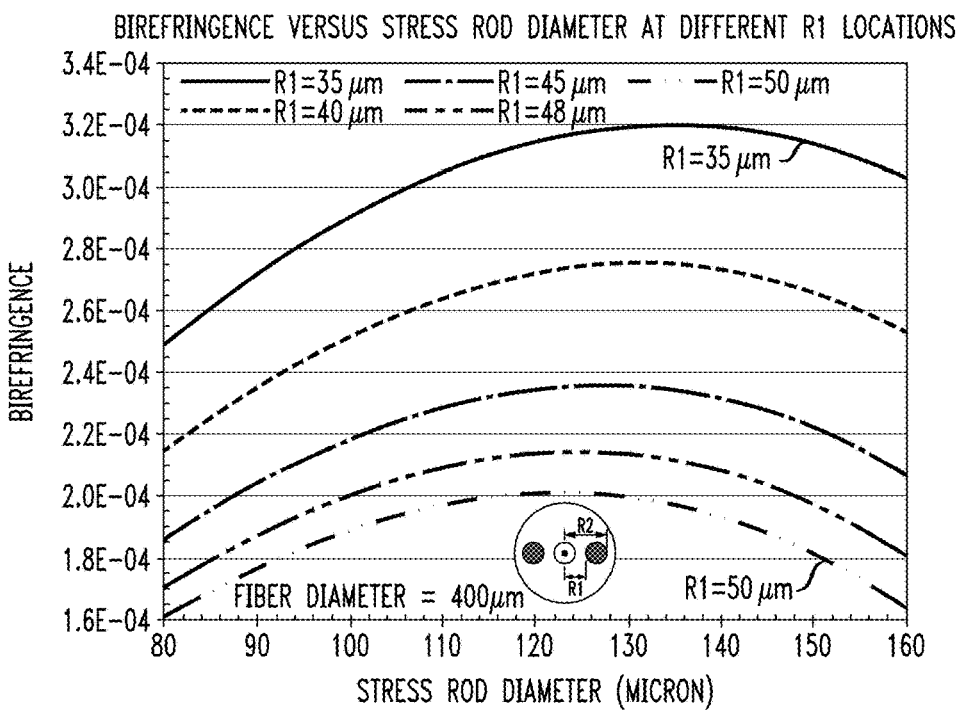
FIG. 12 contains a set of plots of birefringence as a function of stress rod diameter (D) for a set of different R1 values.

FIG. 12 contains a set of plots of birefringence as a function of stress rod diameter for a set of PM-HOM optical fibers formed in accordance with exemplary embodiments of the present invention, each embodiment based upon a different (fixed) R1 separation between the inner core and the stress rods. A fiber outer diameter of 400 μm was maintained for each embodiment, and the birefringence values associated with different stress rod diameters D (ranging from a minimum value of 80 μm to a maximum value of 160 μm) for a given rod location R1 was plotted.

It is interesting to observe from the results shown in FIG. 12 that for a given R1 value, there exists an optimal stress rod diameter D that maximizes the fiber birefringence for that R1 value. For example, in looking at the curve for R1=50 μm, a maximum birefringence is associated with stress rod diameters in the range of about 117 μm to 128 μm. More importantly, since the resultant birefringence does not significantly change with the stress diameter along this region, the optimal diameter also gives a "sweet spot" for more robust processing.

Figure 13:
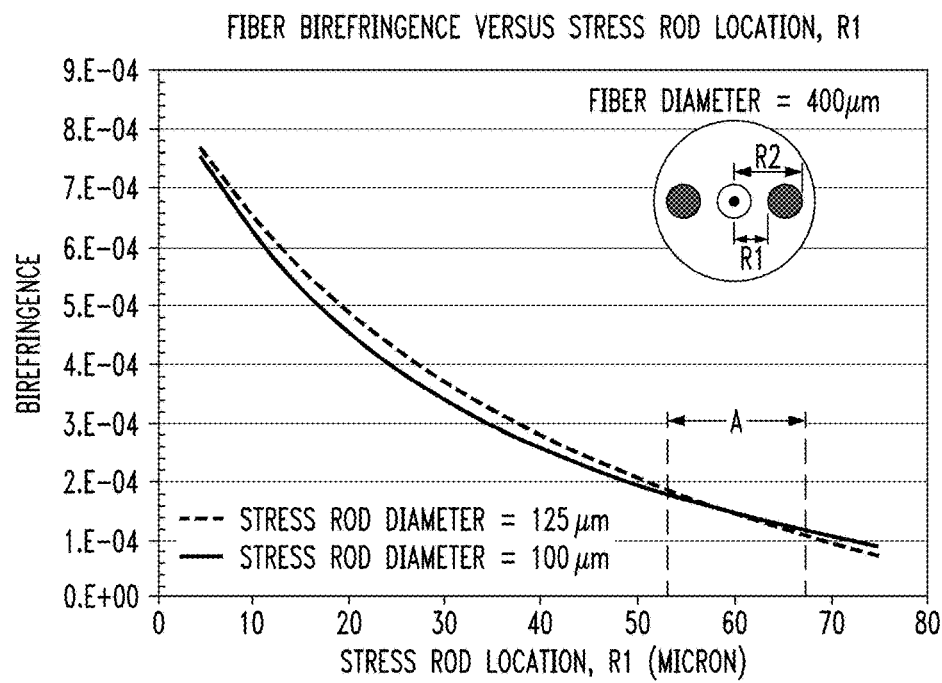
FIG. 13 contains two plots of birefringence values as a function of R1, one plot for a stress rod diameter of 100 µm, and the other associated with a stress rod diameter of 125 µm.

FIG. 13 illustrates particular plots of birefringence as a function of R1 for two different embodiments: one where the stress rod diameter has a value D=125 μm, and the other for stress rods having D=120 μm. It is clear that the difference in birefringence between these two diameter values is slight, and over a certain range of R1 (from about 50-70 μm), shown as region A in FIG. 13, the differences are minimal.

Figure 14:
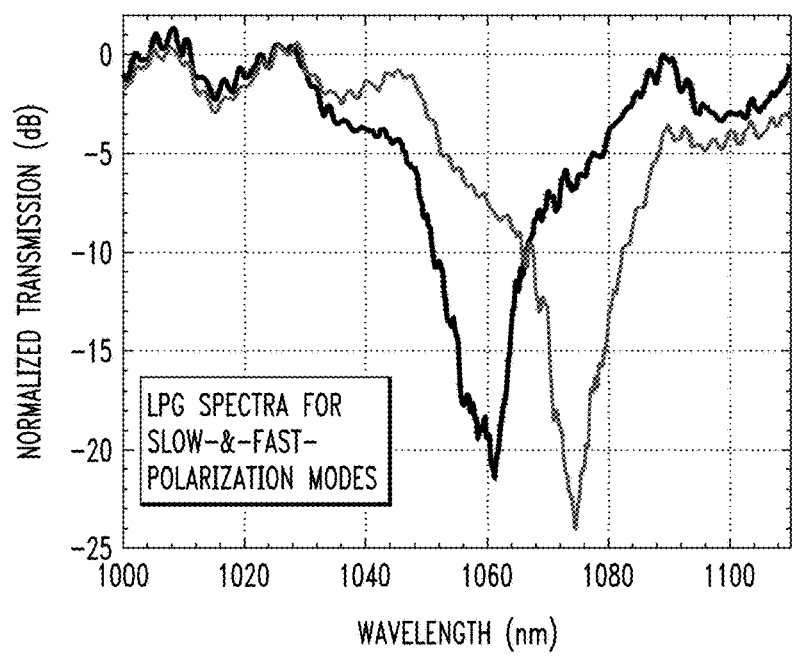
FIG. 14 contains normalized transmission spectra of LPG-inscribed PM-HOM fiber for two different orthogonal polarizations, using a single-mode fiber for in-coupling of light from an optical source into the PM-HOM fiber (the PM-HOM fiber containing an input LPG) and out-coupling of light from the PM-HOM fiber to an optical spectrum analyzer.

It is useful to note that the mode conversion resonance wavelength associated with an LPG of a specific period is distinct for the two orthogonal polarization states. In the example of mode conversion between the $LP_{01}$ and $LP_{08}$ modes by an LPG of period $\Lambda_{LPG}$, the resonance wavelengths for the fast and slow polarization states are related to the effective indices of these modes at different polarization states. In particular, the resonance wavelengths are given as $$\lambda^s = \Lambda_{LPG} \cdot (n_{01}{}^s - n_{0m}{}^s),$$

$$\lambda^f = \Lambda_{LPG} \cdot (n_{01}{}^f - n_{0m}{}^f)$$

where the superscripts, s and f, indicate the slow and fast polarization states respectively; $n_{01}$ and $n_{0m}$ are the effective indices of the $LP_{01}$ and $LP_{0m}$ modes respectively. Within the current wavelength range of operation (i.e., around 1070 nm), the difference in LPG resonance wavelengths between the two polarization states of $LP_{01}$ and $LP_{08}$ modes in the PM-HOM fiber are related to the birefringence value of these modes and it is given as $$\lambda^s - \lambda^f = \Lambda_{LPG} \cdot ((n_{01}^s - n_{01}^f) - (n_{08}^s - n_{08}^f)) \cong \Lambda_{LPG} \cdot [B_{01} - B_{08}]$$

where $B_{01}$ and $B_{08}$ are the birefringence for the $LP_{01}$ and $LP_{08}$ modes, respectively. FIG. 14 shows an example of the resonance wavelengths between $LP_{01}$ and $LP_{08}$ measured at the fast and slow polarization axes.

This shows that LPGs made in PM-HOM fibers can be used for HOM generation at distinct polarization states. Furthermore, LPGs made in PM-HOM fibers can also be used to perform mode conversion for separate polarization states by choosing the appropriate resonance wavelength, as illustrated in FIG. 14. This wavelength-dependent generation of an HOM with a specific polarization state can be very useful in developing devices, such as single-polarization lasers and low-cost optical sensors. It is to be noted, however, that LPGs made in non-PM fiber provide the same mode conversion resonance wavelength regardless of the polarization states. That is, when the inner core, outer core, and cladding regions in exemplary embodiments of the PM-HOM fiber are properly configured (in terms of their refractive indices and dimensions), mode conversion in such exemplary PM-HOM fibers create excitation of higher-order modes of various polarizations and orientations (including, but not limited to, radially and azimuthally polarized, and hybrid modes).

Summarizing, when configuring a PM-HOM optical fiber in accordance with an exemplary embodiment of the present invention, the separation R1 between inner core 12 and the stress rods 20 is dictated by the maximum allowed value of birefringence B that maintains the integrity of the higher-order $LP_{om}$ mode-field-distribution (i.e., avoiding mode distortion and mode crossing), thus maintaining a substantially consistent mode-field-area.

Thus, the two parameters D and R1 may be chosen subject to two opposing constraints:
1) The birefringence B is desired to remain above a certain value; and
2) The normalized effective area is desired to be above a certain value which is very close to the unperturbed HOM configuration. That is, it is one goal to minimize any distortion to the mode from a non-uniform stress distribution attributed to the presence of stress rods. Such non-uniformity would distort the mode profile, reducing the $A_{eff}$ value.

Various exemplary embodiments of the present invention comprise silica-based glass, with selected dopants used to control the refractive indicies in the inner core, outer core, and cladding (as well as the trench, when present). The fiber birefringence is induced by dual stress rods located on either side of the fiber core such that their centers (the core and the pair of stress rods) are essentially collinear. The stress rods are formed of a glass having a thermal expansion coefficient significantly different from the material forming the cladding layer, thus inducing the desired stress properties and low refractive index, thus minimizing disturbance on the spatial modes. Exemplary embodiments of the present invention may be embodied within the following dimensional and compositional ranges:
1) overall PM-HOM optical fiber diameter as measured across the cladding layer being in the range of 180 μm to 800 μm;
2) stress rods are formed of a material that exhibits a CTE that is significantly different from that of the glass material of the cladding (e.g., a ΔCTE in the range of about 0.5× $10^{-6}$/K to $7.5 \times 10^{-6}$/K, when comparing the CTE of the cladding to the CTE of the stress rods);
3) stress rod diameters (D) range from about 50 μm to 150 μm (stress rods may be circular or non-circular);
4) displacement (R1) between the center of the core and a stress rod is the range of about 40 μm to about 200 μm.

These values are exemplary only, and for the purpose of illustrating several different specific embodiments that are considered to fall within the scope of the present invention.

More generally, it is to be noted that these examples and embodiments are merely selected illustrations of the principles of the present invention and do not limit its scope. Additions, omissions, substitutions, and other modifications can be made within a range not departing from the scope of the present invention. Accordingly, the present invention is not limited by the above description and is only limited by the claims appended hereto.

What is claimed is:

1. A polarization-maintaining optical fiber comprising
an inner core, having a first refractive index value and size;
an outer core disposed to surround the inner core, the outer core having a second refractive index value different from the first refractive index value and a diameter sufficient to support the propagation of selected higher-order modes (HOMs) of the propagating optical signal;
a cladding layer disposed to surround the outer core, the cladding layer having a predetermined refractive index value, the combination of the inner core, outer core, and cladding layer configured such that the inner core supports the propagation of a fundamental $LP_{01}$ mode of a propagating optical signal and the outer core supports the propagation of and one or more defined higher-order $LP_{nm}$ modes of the propagating optical signal; and
a pair of stress rods disposed substantially within the cladding layer on either side of the outer core and arranged along a common axis, defining a slow polarization axis, the pair of stress rods formed of a material having a coefficient of thermal expansion (CTE) different from the cladding layer CTE, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

2. The polarization-maintaining optical fiber as defined in claim 1 wherein the first refractive index value is greater than the second refractive index value, so as to support the propagation of LOMs in the inner core, and support the propagation of higher-order $LP_{nm}$ modes in the outer core and cladding layer.

3. The polarization-maintaining optical fiber as defined in claim 1 wherein the optical fiber further comprises a depressed-index trench disposed between the inner core and the outer core, the trench having a refractive index value less than both the first and second refractive index values, wherein the trench is configured to have a width selected to guide higher-order $LP_{nm}$ modes substantially within the outer core.

4. The polarization-maintaining optical fiber as defined in claim 1 wherein the cladding layer comprises
an inner cladding layer disposed adjacent to the outer core, the inner cladding layer having a refractive index value less than the second refractive index value; and an outer cladding layer disposed to surround the inner cladding layer.

5. The polarization-maintaining optical fiber as defined in claim 4 wherein the outer cladding layer has a refractive index value different from the refractive index value of the inner cladding layer.

6. The polarization-maintaining optical fiber as defined in claim 1, wherein the optical fiber further comprises a trench region disposed between the outer core and the cladding layer, the trench layer having a refractive index value substantially less than the second refractive index value, providing substantial confinement of the defined higher-order $LP_{nm}$ modes within the inner core and the outer core.

7. The polarization-maintaining optical fiber as defined in claim 1 wherein the pair of stress rods are formed of a material having a different coefficient of thermal expansion (CTE) than the cladding layer.

8. The polarization-maintaining optical fiber as defined in claim 7 wherein the difference in CTE between the pair of stress rods and the cladding layer is in the range of about $0.5 \times 10^{-6}$/K to about $7.5 \times 10^{-6}$/K.

9. The polarization-maintaining optical fiber as defined in claim 7 wherein the stress rods comprise boron-doped silica.

10. The polarization-maintaining optical fiber as defined in claim 9 wherein the boron dopant concentration is in the range of about 10 mole % to about 30 mole %.

11. The polarization-maintaining optical fiber as defined in claim 7 wherein the stress rods comprise boron-doped and phosphorous-doped silica.

12. The polarization-maintaining optical fiber as defined in claim 11 wherein the boron dopant concentration is in the range of about 10 mole % to about 30 mole %, and the phosphorous dopant concentration is in the range of about 0 mole % to about 20 mole %.

13. The polarization-maintaining optical fiber as defined in claim 1 wherein the stress rods exhibit a circular cross-sectional shape.

14. The polarization-maintaining optical fiber as defined in claim 1 wherein the stress rod exhibits a non-circular cross-sectional shape.

15. The polarization-maintaining optical fiber as defined in claim 14 wherein the non-circular cross-sectional shape is selected from the group consisting of: elliptical shaped, bow-tie shaped, and D-shaped cross-section geometry.

16. The polarization-maintaining optical fiber as defined in claim 1 wherein each stress rod has a diameter D in the range of about 50 μm to about 150 μm.

17. The polarization-maintaining optical fiber as defined in claim 1 wherein each stress rod is separated from a center of the inner core by a distance in the range of about 40 μm to about 200 μm.

18. The polarization-maintaining optical fiber as defined in claim 1 wherein the optical fiber is configured to provide optical gain, in the presence of an optical pump wave in either one or both of the inner core and outer core, the optical fiber comprising one or more rare-earth dopant within either one or both of the inner core and outer core.

19. The polarization-maintaining optical fiber as defined in claim 18 wherein the rare-earth dopant is selected from the group consisting of: Tm, Er, Yb, Ho and Nd.

20. The polarization-maintaining optical fiber as defined in claim 1 wherein for higher-order $LP_{nm}$ modes, n<3 and m>1.

21. The polarization-maintaining optical fiber as defined in claim 20 where n=0.

22. A polarization-maintaining optical system comprising
an optical signal input configuration for supporting the propagation of an incoming lower-order mode optical signal;
an input mode converter disposed at an output termination of the optical signal input configuration for converting the lower-order mode to a selected, higher-order $LP_{nm}$ mode; and
a polarization-maintaining higher-order mode (PM-HOM) optical fiber coupled to the input mode converter, the PM-HOM optical fiber for supporting the propagation of the selected higher-order $LP_{nm}$ mode and including
an inner core sized to support propagation of at least the lower-order mode of the input signal;
an outer core disposed to surround the inner core, the outer core having a diameter selected to support propagation of the selected, higher-order $LP_{nm}$ modes;
a cladding layer disposed to surround the outer core; and
a pair of stress rods disposed substantially within the cladding layer on either side of the outer core and arranged along a common axis, defining a slow polarization axis, the pair of stress rods formed of a material having a coefficient of thermal expansion (CTE) different from the cladding layer CTE, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

23. The polarization-maintaining optical system as defined in claim 22 wherein the optical signal input configuration comprises a section of polarization-maintaining single mode fiber.

24. The polarization-maintaining optical system as defined in claim 22 wherein the optical signal input configuration comprises
a section of single mode optical fiber; and
a polarization controller component coupled to an end termination of the section of single mode optical fiber.

25. The polarization-maintaining optical system as defined in claim 22 wherein the optical signal input configuration comprises
a section of PM-HOM optical fiber.

26. The polarization-maintaining optical system as defined in claim 22 wherein the optical signal input configuration comprises a free space optical link.

27. The polarization-maintaining optical system as defined in claim 22 wherein the input mode converter comprises an optical lens.

28. The polarization-maintaining optical system as defined in claim 22 wherein the input mode converter comprises a long period grating (LPG) created within either one or both of the inner core and outer core of an input portion of the PM-HOM optical fiber.

29. The polarization-maintaining optical system as defined in claim 28 wherein the LPG is formed in the PM-HOM fiber using UV radiation.

30. The polarization-maintaining optical system as defined in claim 29 wherein the UV radiation exposure is directed along the fast axis of the PM-HOM fiber, separate from the location of the pair of stress rods.

31. The polarization-maintaining optical system as defined in claim 22 wherein the system further comprises an output mode converter coupled to the output of the PM-HOM optical fiber and configured to transition the propagating higher-order $LP_{nm}$ signal back into a lower-order mode output signal.

32. The polarization-maintaining optical system as defined in claim 22 wherein the system further comprises a mode converted formed within a portion of the PM-HOM fiber to perform mode conversion for separate polarization states.

33. The polarization-maintaining optical system as defined in claim 32 wherein the mode converter provides mode conversion for separate polarization states by choosing an appropriate resonance wavelength between different modes.

34. The polarization-maintaining optical system as defined in claim 31 wherein the output mode converter comprises an LPG created within the inner core of an output portion of the PM-HOM optical fiber.

35. The polarization-maintaining optical system as defined in claim 31 wherein the output mode converter comprises an LPG created within the outer core of an output portion of the PM-HOM optical fiber.

36. The polarization-maintaining optical system as defined in claim 31 wherein the output mode converter comprises an optical lens.

37. The polarization-maintaining optical system as defined in claim 36 wherein the optical lens comprises an axicon lens.

38. The polarization-maintaining optical system as defined in claim 37 wherein for the selected, higher order $LP_{nm}$ mode, n<3 and m>1.

39. The polarization-maintaining optical system as defined in claim 38 wherein n=0.

40. The polarization-maintaining optical fiber as defined in claim 1 wherein for an optical signal propagating at a defined wavelength of $\lambda$ a normalized effective area of $A_{eff}/\lambda^2$ greater than 1000 is provided.

41. The polarization-maintaining optical fiber as defined in claim 1 wherein for selected values of D and R1, a polarization extinction ratio greater than 10 dB is provided.

42. The polarization-maintaining optical fiber as defined in claim 1 wherein for selected values of D and R1, a birefringence greater than $1*10^{-4}$ is provided.

43. The polarization-maintaining optical fiber as defined in claim 1 wherein the first refractive index value, the second refractive index value, and the third refractive index, in combination with the diameter of the inner core, outer core, and cladding layer are configured to provide excitation of higher-order modes of various polarizations and orientations, including radially polarized and azimuthally polarized, and hybrid modes.

* * * * *